United States Patent [19]

Mazuir

[11] 4,059,780

[45] Nov. 22, 1977

[54] SYNCHRONOUS MOTOR

[75] Inventor: Maurice Mazuir, Cluses, France

[73] Assignee: Carpano & Pons, France

[21] Appl. No.: 643,531

[22] Filed: Dec. 22, 1975

[30] Foreign Application Priority Data

Jan. 20, 1975 France .................. 75.01653

[51] Int. Cl.² ............................................. H02K 21/12
[52] U.S. Cl. .............................. 310/164; 310/40 MM;
310/257
[58] Field of Search ................................ 310/162–165,
310/156, 41, 257, 40 MM

[56] References Cited

U.S. PATENT DOCUMENTS 3,414,751  12/1968  Bossard ................................ 310/164
3,857,053  12/1974  Yatsushiro et al. ............... 310/164 X
3,940,645  2/1976  Takita ................................... 310/156

Primary Examiner—Donovan F. Duggan
Attorney, Agent, or Firm—Robert E. Burns; Emmanuel J. Lobato; Bruce L. Adams

[57] ABSTRACT

A synchronous motor comprises a rotor of permanently magnetized high coercivity material and a stator formed of two metal plates having projecting imbricated poles which are placed between an induction coil and the rotor. The air gaps between the ends of the poles of one plate and the other plate are at most equal to one tenth the length of said poles and up to a maximum value of 1.2 mm, so as to increase the self-induction of the coil hence enabling a reduction of its resistance and a saving in the cost of the wire of the coil.

2 Claims, 4 Drawing Figures

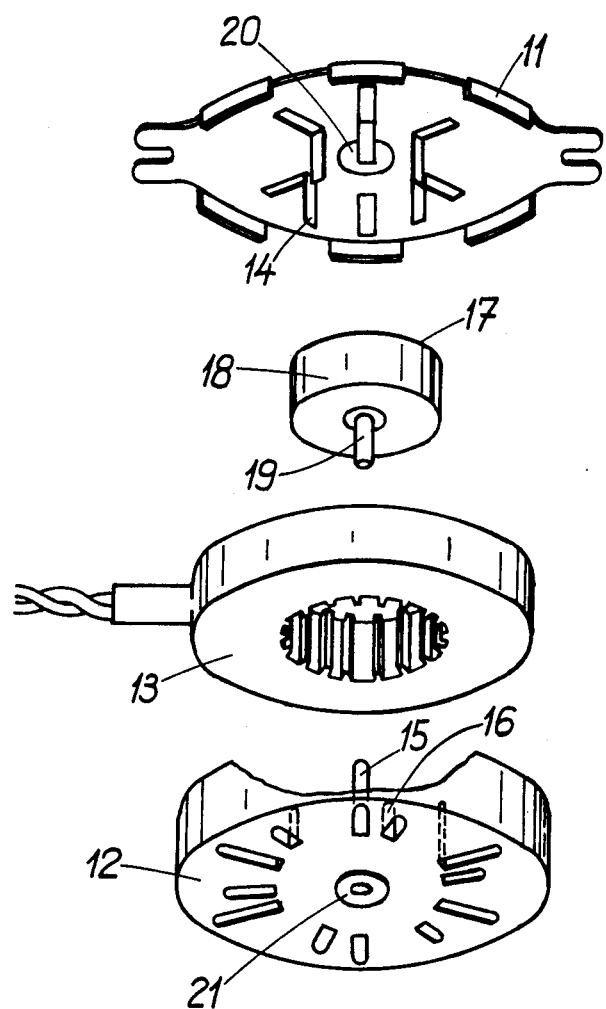

SYNCHRONOUS MOTOR

BACKGROUND OF THE INVENTION

The invention concerns synchronous motors of the type comprising a rotor of permanently magnetized high coercivity material, and a stator comprising at least two metal plates enclosing an induction coil, each plate having projecting poles imbricated between poles of the other plate, said poles being placed between the induction coil and the rotor.

In known synchronous motors of this type, such as that described in French Pat. No. 1,522,320, the self induction of the induction coil is low. To limit the current consumption, it is thus necessary, unless external resistive and capacitative elements are employed, to provide the induction coil with a high resistance, involving the use of a small diameter (i.e. about 0.05 mm) enamelled copper wire with a sufficient number of windings. Consequently there is a relatively great length and hence weight of wire per coil. This is a disadvantage, as low-diameter enamelled copper wire is of very high cost, and the cost of the wire may amount to 50% of the overall cost price of the motor. Moreover, heating of the coil is proportional to $RI^2$, where R is the resistance of the coil and I the current flowing through the coil. Hence, the greater the value of R, the value of I must be consequentially reduced to limit the maximum heating of the motor. This is therefore a second disadvantage resulting from the need of employing a high resistance wire for the induction coil.

SUMMARY OF THE INVENTION

An object of the invention is to avoid these drawbacks by allowing a reduction in the resistance R of the induction coil. This reduction of the resistance enables a reduction of the number of winding of the coil, and hence a substantial reduction — of about 15 to 20% — of the weight of enamelled copper wire used, with a corresponding reduction in the quantity of the wire. This reduction of resistance may also enable the use of an enamelled copper wire of greater diameter: for example 0.07 mm diameter instead of 0.05 mm, the former wire being approximately 25% cheaper than the latter and being easier to use as its mechanical resistance is greater so that the winding operation can be carried out more rapidly with a reduced risk of breakage of the wire.

In a synchronous motor according to the invention, the stated reduction in the resistance of the induction coil and the consequential advantages are made possible by increasing the self induction of the coil by arranging that, compared to prior art motors, at least some of the poles of one of said plates are extended in length towards the opposite plate to reduce the air gap between the ends of said poles and the opposite plate to at most one tenth of the length of the corresponding poles and up to a maximum value of 1.2 mm.

Synchronous motors, for example that disclosed in French Pat. No. 2,032,148, are known in which certain poles are longer than the others; but in this case, the longer poles are auxiliary ones dephased by a short-circuited winding. The purpose of elongation of the poles is to increase dephasing. This elongation may possibly produce an increase in the self induction of the induction coil, but its effect is strongly attenuated because of the magnetic load formed by the dephasing ring.

In the motor according to the invention, the provision of relatively long principal poles with reduced end air-gaps involves a reduction in the performance of the motor. However, for certain low-torque applications, such as horology or for the driving of programmers, this reduction of performance does not involve any drawback and the precedingly cited advantages are considerably more important. However, for other applications requiring high performance motors, it is possible to employ an expedient to maintain the motor performance despite the previously mentioned elongation of the poles. This is applicable to synchronous motors whose stator comprises single equally spaced-apart poles on one plate and pairs of consecutive poles disposed on the other plate, namely a principal pole and an auxiliary pole arranged between single poles of said one plate. This is the most commonplace type of synchronous motor, the purpose of the assymetric pole arrangement being to facilitate starting. According to the invention, a feature of such a motor is that the sum of the widths of a pair of principal and auxiliary poles of said other plate is equal to the width of a single pole of said one plate.

BRIEF DESCRIPTION OF THE DRAWINGS

A prior-art arrangement and embodiments of the invention are shown, by way of example, in the accompanying drawings, in which:

FIG. 2 is an exploded perspective view of a first embodiment of synchronous motor according to the invention;

DESCRIPTION OF THE PREFERRED EMBODIMENTS

Figure 1:
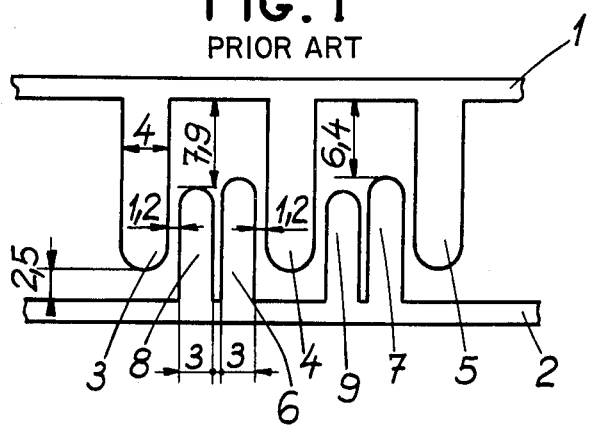
FIG. 1 is a schematic side elevational view of some of the stator poles of a conventional synchronous motor.

FIG. 1 schematically shows the stator poles of a conventional synchronous motor according to the previously-cited French Pat. No. 1,522,320. This motor comprises two plates 1 and 2. FIG. 1 shows three principal poles 3, 4 and 5 of plate 1 and some principal poles 6, 7 and auxiliary poles 8, 9 of plate 2. Numerical values of the lengths of these poles and the corresponding end air gaps are indicated on FIG. 1, the air gaps being 2.5 mm, 7.9 mm and 6.4 mm, as shown. The induction coil, not shown in FIG. 1, comprises 10,200 windings of enamelled copper wire of 0.05 mm diameter, namely a weight of 18 grams. The coil has a resistance of 9,600 Ohm and the current consumption is 14.1 mA. Consequently $RI^2$ is equal to 1.91 W. The torque on the motor shaft is 0.066 cm. da N.

Figure 3:
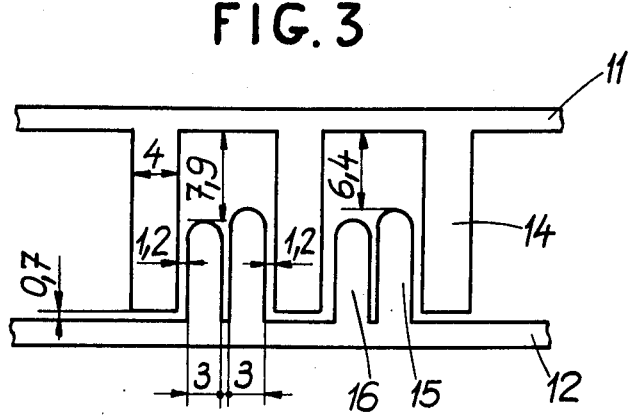
FIG. 3 is a view similar to FIG. 1 of stator poles of the motor of FIG. 2.

The synchronous motor according to the invention shown in FIGS. 2 and 3 comprises a stator formed of two metal plates or flanges 11 and 12 enclosing an induction coil 13. Flange 11 carries six projecting principal poles 14 spaced apart equally from one another in circular configuration and inserted between pairs of poles of flange 12. Flange 12 carries six corresponding pairs of principal poles 15 and auxiliary poles 16. The poles 14, 15, 16 are all bent perpendicular to the main face of the flanges and are disposed between induction coil 13 and a rotor 17. This rotor 17 is formed of a high-coercivity permanent magnet 18 supported by a shaft 19 journalled in bearings 20, 21 in the respective flanges 11 and 12. Numerical values of the widths of poles 14, 15 and 16 are indicated on FIG. 3, as well as the values of the air-gaps, namely 0.7 mm between poles 14 and flange 12, 7.9 mm between the auxiliary poles 16 and flange 11, and 6.4 mm between the principal poles 15 and flange 11. The induction coil 13 has 9,000 windings of enamelled copper wire of diameter 0.05 mm; namely a weight of 15.3 grams. The resistance of coil 13 is 8,200 Ohm and the current consumption 15.4 mA. The value of $RI^2$ is hence 1.94 W. The torque produced on the motor shaft is 0.56 cm. da N.

A comparison of this motor according to the invention with the prior art motor of FIG. 1 shows that the flanges and their poles are the same except for the 2.5 mm air-gap which has been reduced to 0.7 mm. The reduction of this air gap results in a considerable increase in the flux produced by the induction coil by reducing the reluctance of the magnetic circuit formed by the stator. This produces an increase in the self-induction of the induction coil and simultaneously an increase in its impedance. This latter increase corresponds to a reduction in the current flowing in the induction coil, so that the value $RI^2$ is reduced. It is possible, if it is desired to maintain $RI^2$ at its previous value (i.e. that of the prior art motor) to reduce the resistance of the induction coil. In this manner, in the quoted example, the weight of enamelled copper wire of 0.05 mm diameter has been reduced by 17%, which is a very appreciable saving. The driving torque has been reduced but, as indicated previously, this is acceptable for many applications.

Figure 4:
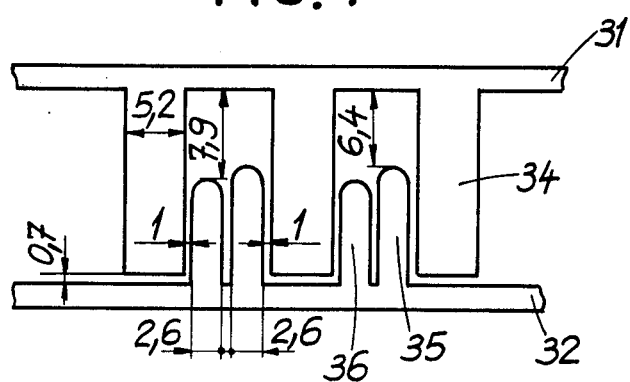
FIG. 4 is a similar view of stator poles of a second embodiment of motor according to the invention.

FIG. 4 shows a second embodiment of synchronous motor according to the invention in which flange 11 of the first embodiment is replaced by a flange 31 carrying principal poles 34, and flange 12 is replaced by a flange 32 carrying principal poles 35 and auxiliary poles 36. Numerical values of the dimensions of the poles and air gaps are indicated on FIG. 4, and it is observed that the sum of the widths of each pair of an auxiliary pole 35 and a principal pole 36, namely 2.6 mm each, is equal to the width 5.2 mm of the poles 34 of flange 31. All of the other elements are the same as for the previous embodiment.

Such a dimensioning of the poles enables an increase in the performance of the motor since the flux produced by the rotor is increased. Hence, the driving torque, which is proportional to this flux, is also increased. Such an increase in the flux is only advantageous when the torque is low, since otherwise this increase would produce unacceptable vibrations of the rotor. The motor of FIG. 4 thus achieves an appreciable saving in the quantity of copper wire while maintaining substantially the same the driving torque as for the motor of FIG. 1.

The synchronous motor according to the invention may be used in all cases where such a motor must be manufactured economically, while maintaining high performance. Particularly interesting applications are, for example, in horology and for driving the programmers of washing machines.

What is claimed is:

1. In a synchronous motor, a stator comprising a first plate having a plurality of axial poles spaced thereon from each other in a circular configuration and a second plate spaced from the first plate and in opposed relationship therewith, said second plate having a plurality of paired poles arranged in a circular configuration in pairs with the pairs spaced from each other, the individual pairs of poles disposed extending axially between next adjacent poles of the first plate, an induction coil circumferentially of all of said poles, a rotor disposed for rotation within the circular configuration of the poles of said first and second plates and coaxial therewith, the poles on each of said plates having ends spaced from the other opposed plate to define therebetween axial air gaps, the improvement wherein the air gaps defined by some poles of one of said plates have an axial length equal at most to one tenth the axial length of said some poles, and up to a maximum axial length of 1.2 mm.

2. A synchronous motor according to claim 1, in which said one plate of said stator comprises alike poles equally spaced apart, said pairs of poles each comprising a principal pole axially shorter auxiliary pole, the sum of the widths of each said pair of poles being equal to the width of one of said alike poles of said one plate.

* * * * *